United States Patent
Ainsworth et al.

(10) Patent No.: US 9,071,544 B2
(45) Date of Patent: Jun. 30, 2015

(54) METHOD AND SYSTEM FOR MANAGING NETWORK ELEMENTS

(75) Inventors: Stephen Ainsworth, Minneapolis, MN (US); Edward C. McGlaughlin, Minneapolis, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 619 days.

(21) Appl. No.: 13/193,462

(22) Filed: Jul. 28, 2011

(65) Prior Publication Data

US 2013/0031230 A1 Jan. 31, 2013

(51) Int. Cl.
*G06F 15/173* (2006.01)
*H04L 12/24* (2006.01)

(52) U.S. Cl.
CPC ...................... *H04L 41/26* (2013.01)

(58) Field of Classification Search
CPC ............. H04L 41/0213; H04L 29/08072
USPC .................... 709/233; 370/235–389
See application file for complete search history.

(56) References Cited

U.S. PATENT DOCUMENTS

| | | | |
|---|---|---|---|
| 7,200,144 B2 * | 4/2007 | Terrell et al. | 370/389 |
| 7,518,995 B1 * | 4/2009 | Dropps et al. | 370/235 |
| 8,050,260 B1 | 11/2011 | Dropps et al. | 370/389 |
| 8,060,682 B1 * | 11/2011 | Genetti et al. | 710/317 |
| 8,296,386 B1 * | 10/2012 | Micalizzi, Jr. | 709/212 |
| 8,307,062 B2 * | 11/2012 | Jain et al. | 709/223 |
| 2003/0041263 A1 * | 2/2003 | Devine et al. | 713/201 |
| 2003/0079121 A1 * | 4/2003 | Gilman et al. | 713/153 |
| 2003/0088633 A1 * | 5/2003 | Chiu et al. | 709/206 |
| 2004/0177359 A1 * | 9/2004 | Bauch et al. | 719/313 |
| 2005/0160150 A1 * | 7/2005 | Kao | 709/212 |
| 2006/0053221 A1 * | 3/2006 | Matsui et al. | 709/225 |
| 2006/0235977 A1 * | 10/2006 | Wunderlich et al. | 709/227 |
| 2007/0083665 A1 * | 4/2007 | Miao | 709/230 |
| 2007/0088795 A1 * | 4/2007 | Dunbar | 709/217 |
| 2007/0101122 A1 * | 5/2007 | Guo | 713/153 |
| 2007/0288754 A1 * | 12/2007 | Kaji et al. | 713/175 |
| 2008/0002625 A1 * | 1/2008 | Cho et al. | 370/331 |
| 2009/0094150 A1 * | 4/2009 | Feng et al. | 705/35 |
| 2010/0100696 A1 * | 4/2010 | Suzuki | 711/162 |
| 2010/0274883 A1 * | 10/2010 | Yamamoto et al. | 709/223 |
| 2010/0315997 A1 * | 12/2010 | Kim | 370/328 |
| 2011/0032874 A1 * | 2/2011 | Kim et al. | 370/328 |
| 2011/0060829 A1 * | 3/2011 | Pithawala et al. | 709/224 |
| 2013/0031230 A1 * | 1/2013 | Ainsworth et al. | 709/223 |

\* cited by examiner

*Primary Examiner* — Razu Miah
(74) *Attorney, Agent, or Firm* — Klein, O'Neill & Singh, LLP

(57) ABSTRACT

A management request complying with a first protocol is generated by a management application executed by a computing system coupled to a network element. A processor executable agent encapsulates a management request using a second protocol. The encapsulated management request is transmitted using a third protocol via a link used by the computing system to send input/output requests for reading and writing data to a storage device. The management request is de-encapsulated to provide the management request complying with the first protocol to a management module of the network element. The management module of the network element prepares a response to the management request complying with the first protocol. A processor executable service at the network element encapsulates the response using the second protocol. The encapsulated response is transmitted to the computing system using the third protocol. The response complying with the first protocol is extracted from the encapsulated response. The response complying with the first protocol is provided to the management application.

12 Claims, 5 Drawing Sheets

METHOD AND SYSTEM FOR MANAGING NETWORK ELEMENTS

TECHNICAL FIELD

The present disclosure relates to network communications.

BACKGROUND

A computer network, often simply referred to as a network, is a group of interconnected computers and devices that facilitates communication among users and allows users to share resources. Adapters, switches and other devices are typically used during network communication. Continuous efforts are being made to better manage network devices.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

One of the present embodiments is a machine implemented method for processing a management request complying with a first protocol and generated by a management application executed by a computing system coupled to a network element. The method comprises a processor executable agent encapsulating the management request using a second protocol. The method further comprises transmitting the encapsulated management request using a third protocol via a link used by the computing system to send input/output requests for reading and writing data to a storage device. The method further comprises de-encapsulating the management request to provide the management request complying with the first protocol to a management module of the network element. The method further comprises the management module of the network element preparing a response to the management request complying with the first protocol. The method further comprises a processor executable service at the network element encapsulating the response using the second protocol. The method further comprises transmitting the encapsulated response to the computing system using the third protocol. The method further comprises extracting the response complying with the first protocol from the encapsulated response. The method further comprises providing the response complying with the first protocol to the management application.

Another of the present embodiments is a system. The system comprises a processor of a computing system executing a management application for generating a management request complying with a first protocol. The system further comprises a processor executable agent configured to encapsulate the management request using a second protocol. The system further comprises a network element configured to receive the encapsulated management request via a third protocol using a link used by the computing system to send input/output requests for reading and writing data to a storage device. The system further comprises the network element de-encapsulates the management request to provide the management request complying with the first protocol to a management module of the network element that prepares a response to the management request complying with the first protocol. The system further comprises a processor executable service at the network element configured to encapsulate the response using the second protocol and the encapsulated response is transmitted to the computing system using the third protocol. The system further comprises the response complying with the first protocol is extracted from the encapsulated response and then provided to the management application.

Another of the present embodiments is a machine implemented method for processing a management request complying with a first protocol and generated by a management application executed by a computing system coupled to a network element. The method comprises encapsulating the management request using a second protocol. The method further comprises transmitting the encapsulated management request to the network element using a third protocol. The method further comprises preparing a response to the management request complying with the first protocol. The method further comprises encapsulating the response using the second protocol. The method further comprises transmitting the response to the computing system using the third protocol. The method further comprises extracting the response complying with the first protocol. The method further comprises providing the response complying with the first protocol to the management application.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
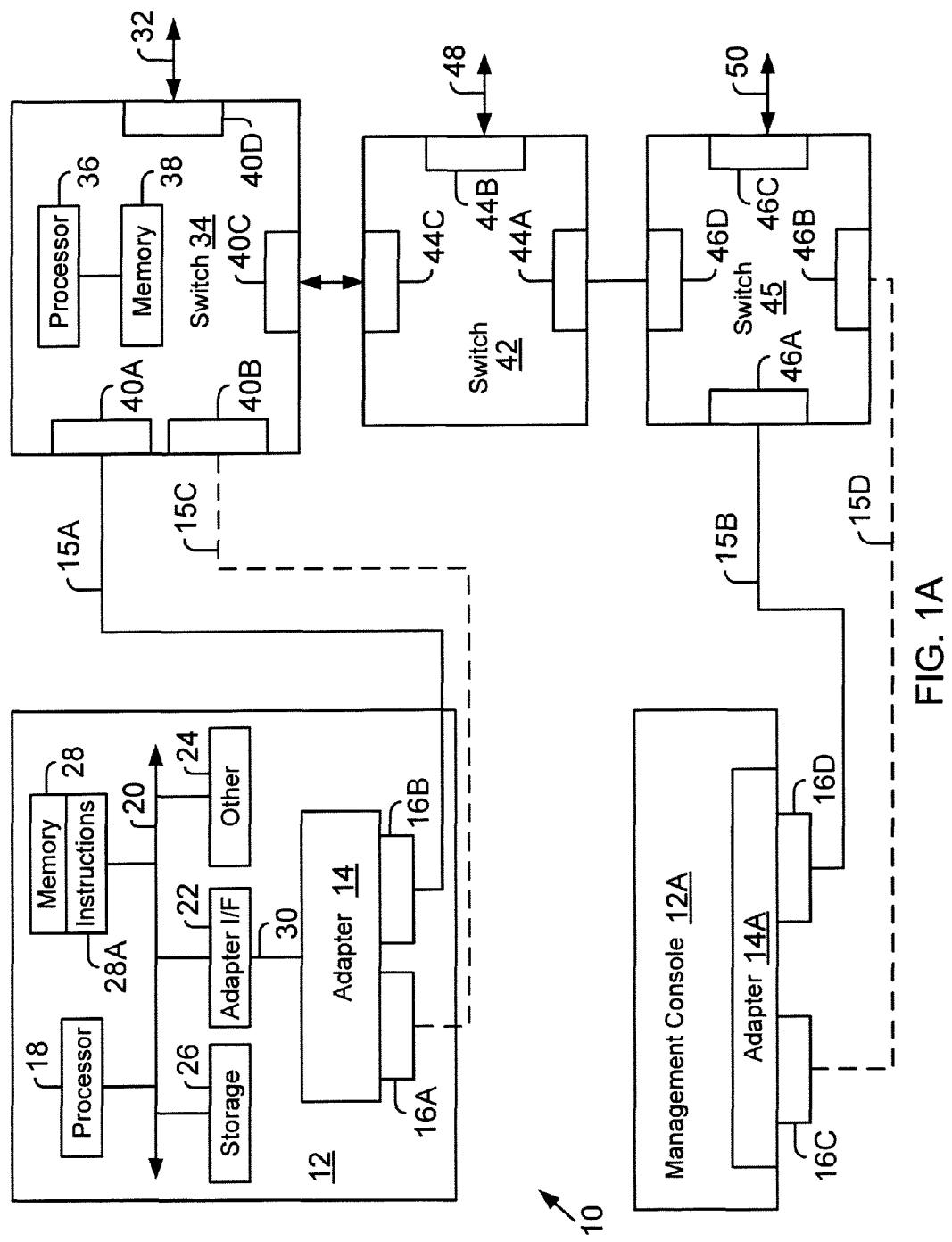
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be readable by a computing system, and encoding a computer program of instructions for executing a computer process.

FIG. 1A is a block diagram of a system 10 configured for use with the present embodiments. System 10 includes a plurality of computing systems 12 (may also be referred to as management console 12) coupled to an adapter 14 that interfaces with other devices, as described below in more detail.

The computing system 12 may include one or more processors 18, also known as central processing units (CPUs). Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 18 executes machine implemented process steps (shown as instructions 28A) out of a memory 28 and interfaces with an interconnect 20 that may be referred to as a computer bus 20. The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The computing system 12 may further include a storage device 26, which may be for example a hard disk, a CD-ROM, a non-volatile memory device (flash or memory stick) or any other storage device. Storage 26 may store operating system program files, application program files, for example, management applications, and other files. Some of these files are stored on storage 26 using an installation program. For example, the processor 18 may execute computer-executable process steps of an installation program so that the processor 18 can properly execute the application program.

Memory 28 also interfaces with the computer bus 20 to provide the processor 18 with access to memory storage. Memory 28 may include random access main memory (RAM). When executing stored computer-executable process steps from storage 26, the processor 18 may store and execute the process steps out of memory 28. Read only memory (ROM, not shown) may also be used to store invariant instruction sequences, such as start-up instruction sequences or basic input/output system (BIOS) sequences for operation of a keyboard (not shown).

The computing system 12 also includes other devices and interfaces 24, which may include a display device interface, a keyboard interface, a pointing device interface, etc. The details of these components are not germane to the inventive embodiments.

Adapter 14 may be configured to handle both network and storage traffic while interfacing with other elements. Various network and storage protocols may be used to handle network and storage traffic, for example, Ethernet, Fibre Channel, Fibre Channel over Ethernet, and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel is a common storage protocol used in storage area networks (SANs). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. In one embodiment, adapter 14 can be configured to operate as a FCOE adapter and may be referred to as FCOE adapter 14 or a converged adapter 14. QLogic Corporation, the assignee of the present application, provides one such adapter. Those of ordinary skill in the art will appreciate, however, that the present embodiments are not limited to any particular protocol. The illustrated FCOE adapter 14 is merely one example of a converged network adapter that may leverage the advantages of the present embodiments.

Referring back to FIG. 1A, an adapter interface 22 couples computing system 12 to adapter 14 via a link 30. Adapter 14 may include two ports 16A and 16B that are coupled to a switch 34. Ports 16A/16B include logic and circuitry to send and receive information.

Switch 34 includes a plurality of ports 40A-40D, and a processor 36 having access to memory 38. Processor 36 executes firmware instructions out of memory 38 to control overall switch operations and some of the process steps according to the present disclosure that are described below in detail. Port 40A of switch 34 is coupled to port 16B, while port 40B is coupled to port 16A. Port 40D may be coupled to other elements via link 32.

Port 40C of switch 34 is coupled to another switch 42 that includes ports 44A-44C. Port 44C of switch 42 is coupled to port 40C of switch 34. Port 44B of switch 42 may be coupled to other elements via link 48 and port 44A is coupled to port 46C of another switch 45 that includes ports 46A-46D. Port 46A is coupled to an adapter port 16D of adapter 14A of computing system 12A that is similar to computing system 12. Adapter 14A is also similar to adapter 14 that is described above in detail. Port 46B is coupled to adapter port 16C. Port 46C is coupled to other elements (not shown) using link 50.

The various embodiments disclosed herein are not limited to any particular number of switch ports. The term switch port as used herein means a structure having logic and circuitry that can send and receive information.

Switches 34, 42, 45 may be a part of a network (or fabric). The size and location of the network may vary based on user needs. The structure of switch 42, 45 may be similar to switch 34 with respect to having a processor 36, memory 38 and a certain number of ports to communicate with other devices as described above.

A network administrator typically manages switches within a fabric using one or more management consoles, for example, computing systems 12 and 12A. Typically, the computing systems use a first network link or type to connect with a switch and a second network link or type to send and receive management related information. For example, link 15A connecting port 16B with port 40A may be a Fibre Channel link for sending and receiving information in response to input/output (I/O) requests that comply with the Fibre Channel standard. The management link may be 15C that couples port 16A with port 40B for sending and receiving management requests/responses.

In conventional systems, link 15C may be an Ethernet link that is used for sending and receiving management requests/responses. A similar configuration is used by computing system 12A, where link 15B may be a Fibre Channel link and the management link 15D may be an Ethernet link.

The conventional technique of using an Ethernet link/Ethernet network for management requests/responses and Fibre Channel link/Fibre Channel network for processing I/O requests is undesirable, because an administrator has to manage two network/link types, i.e. the Fibre Channel network for storing data and the Ethernet network for sending and receiving management requests. The embodiments disclosed herein provide a solution where different network links/networks are not needed for sending management requests and receiving responses to management requests.

Figure 1B:
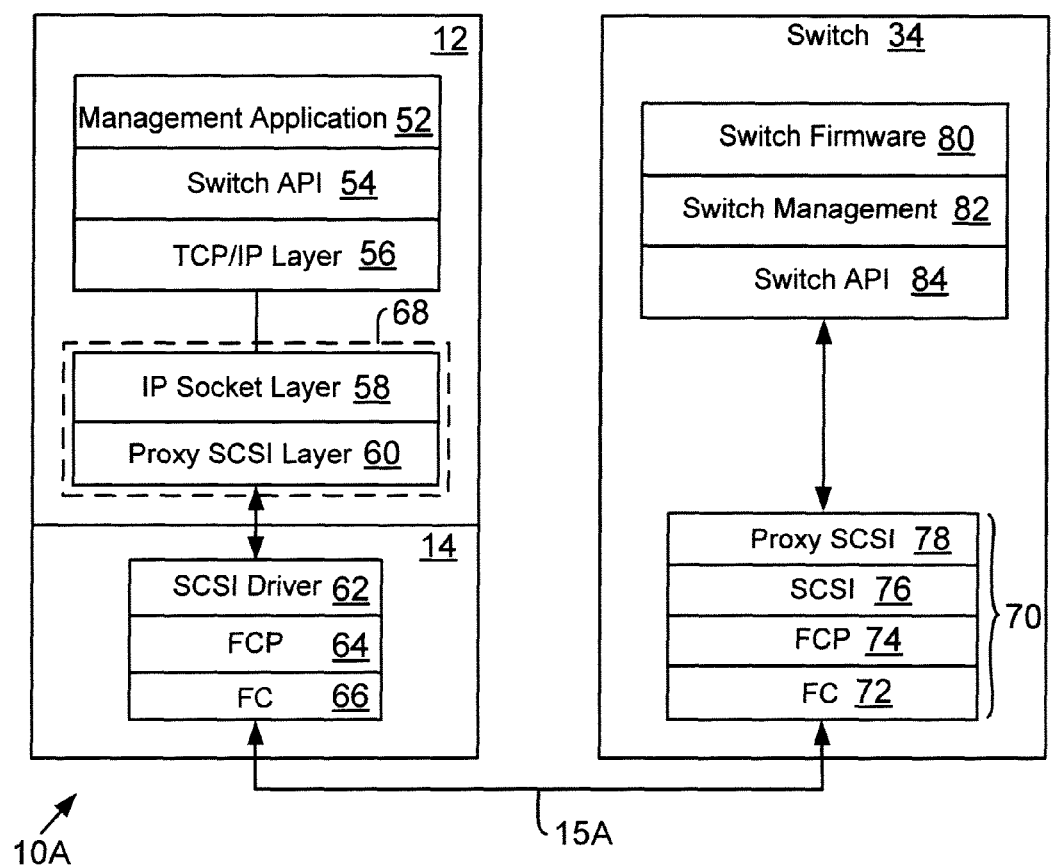
FIG. 1B shows a system for managing network elements, according to one embodiment.

FIG. 1B shows an example of a system 10A for managing network elements, according to one embodiment. System 10A includes computing system 12 that communicates with switch 34 only using link 15A. Link 15B for management tasks is not needed because of the structure of system 10A that is described in more detail below.

Computing system 12 executes a management application 52 out of a memory (for example, memory 28, FIG. 1A). In one embodiment, hardware based processor 18 executes the management application 52. The management application 52 is used to send management related commands to switch 34, for example, a command to obtain switch 34 attributes, a command to obtain statistics collected by switch 34 regarding network traffic or any other type of management command/request.

Management application 52 typically communicates via a switch Application Programming Interface (API) 54 that may also be executed by processor 18. Switch API 54 receives commands from management application 52 and prepares them for a next layer, for example, a Transmission Control Protocol (TCP)/Internet Protocol (IP) layer 56. The TCP/IP layer 56 interfaces with a pseudo Small Computer System Interface (SCSI) agent 68. Agent 68 may include an IP socket layer 58 and a proxy SCSI layer 60. The IP socket layer 58 prepares the management request as if it is communicating with an Ethernet port. The proxy SCSI layer 60 takes the standard Ethernet based management request and encapsulates the request into a SCSI request, for example, a SCSI command data block (CDB) that is defined by the SCSI standard.

The encapsulated management request as a SCSI CDB is then processed by adapter 14 that executes a SCSI driver layer 62, a FCP layer 64 and a FC layer 66. The SCSI driver layer 62 is able to identify and process the SCSI CDB generated by agent 68. The FCP layer 64 is the Fibre Channel Protocol layer used for handling SCSI commands via Fibre Channel. The FC layer 66 is the standard layer for Fibre Channel communication via the Fibre Channel link 15A. Adapter 14 encapsulates the SCSI CDB as a Fibre Channel command using a FCP and FC header, as described below in more detail.

Switch 34 includes firmware 80 that controls overall switch operations. Switch management module 82 is used to perform management related tasks in response to management requests received via switch API 84. As an example, if computing system seeks switch attributes including switch identification information, port identifiers, connection information and other type of information, then switch management module 82 gathers the information and prepares a response in a format that can be understood by management application 52.

Switch 34 executes a pseudo target service 70 that includes a proxy SCSI layer 78, a SCSI layer 76, a FCP layer 74 and a FC layer 72. The pseudo target service 70 includes instructions that are executed by a hardware component, for example, processor 36.

The management request encapsulated in a Fibre Channel command is processed by the proxy SCSI layer 78 that de-encapsulates the SCSI CDB and extracts the management request sent by management application 52. The request is then forwarded via the switch API 84 to switch management module 82 that obtains the information for responding to the management request. The switch management module 82 also prepares the response to the management request.

The response generated by switch management module 82 is sent to the proxy SCSI layer 78 via the switch API 84. The proxy SCSI layer 78 encapsulates the switch response into a SCSI CDB that is further encapsulated into a Fibre Channel packet having a FCP and FC header, as described below in more detail. The Fibre Channel packet is then sent via layers 74 and 72 to adapter 14 as a Fibre Channel packet.

The adapter 14 parses the Fibre Channel packet and extracts the response as a SCSI CDB. The SCSI CDB is passed to the proxy SCSI layer 60 that extracts the response from the SCSI CDB and transfers the response via the TCP/IP and switch API layers to management application 52 in a format that is understood by the management application 52.

In one embodiment, switch 34 is presented to computing system 12/adapter 14 as a proxy SCSI target. Switch management operations are then tunneled using standard SCSI protocol command. This allows one to use an existing FC link/network and not rely on a separate network for management requests/responses.

The systems and methods disclosed herein use the pseudo SCSI agent 68 and the pseudo SCSI service 70 for processing management requests. As mentioned above, agent 68 communicates with higher level layers (e.g. 52) and translates, encapsulates and de-encapsulates management operations using the SCSI protocols.

Figure 1C:
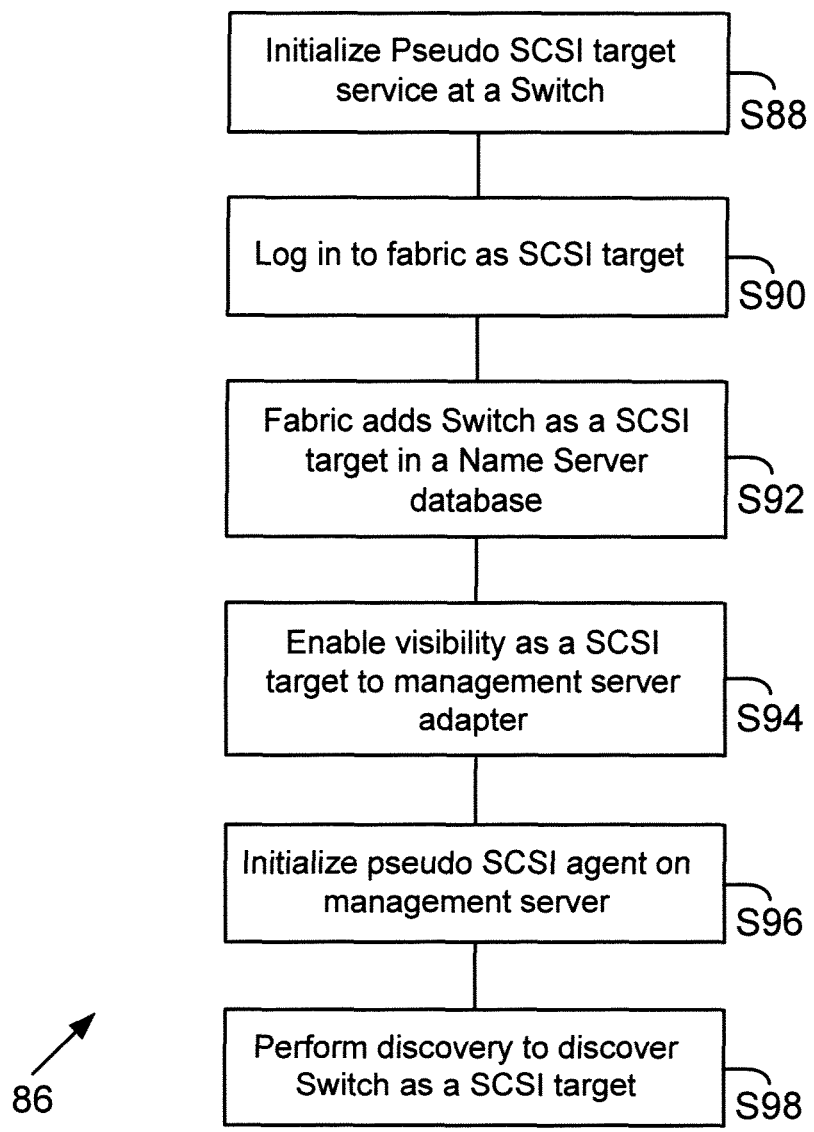
FIG. 1C shows a process flow diagram for configuring a network element according to one embodiment.

FIG. 1C shows a process 86 for registering switch 34 as a SCSI target for receiving management requests via a FC link, according to one embodiment. The process begins in block S88, when the pseudo target service 70 is initialized at switch 34. In one embodiment, processor 36 of switch 34 initializes pseudo target service 70. In block S90, the pseudo target service 70 logs into a fabric switch (for example, switch 42. FIG. 1A) as a SCSI target. In block S92, the fabric switch adds switch 34 as a target. The information regarding switch 34 may be maintained as a structure, for example, as part of a standard Name Server database.

In block S94, switch 34 appears as a SCSI target to adapter 14. In block S96, the pseudo SCSI agent 68 is initialized at computing system 12 and may be configured to use the same Internet Protocol (IP) address used by computing system 12 or a component of computing system 12, for example, a network interface card (not shown) or adapter 14. Switch 34 is then discovered as a SCSI target in block S98 by pseudo agent 68.

Figure 2A:
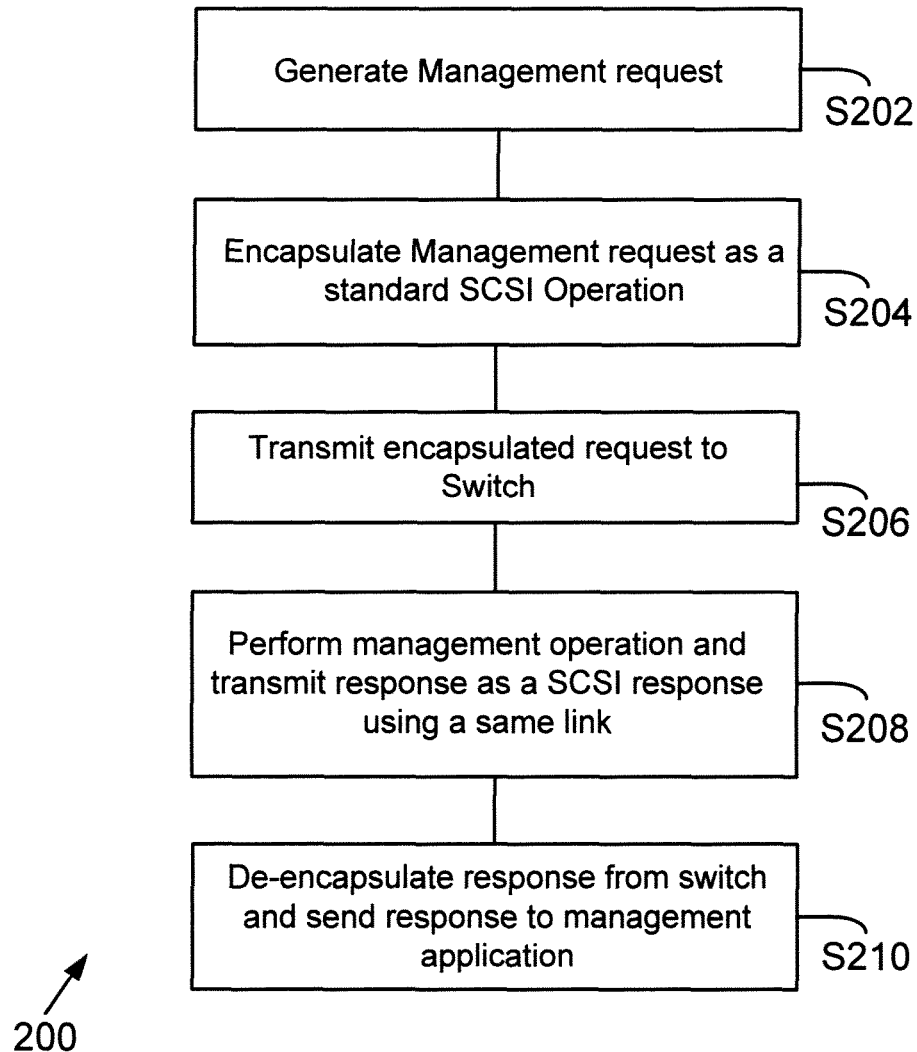
FIG. 2A is a process flow diagram for managing network elements, according to one embodiment.

FIG. 2A shows a process 200 for processing a management request, according to one embodiment. The process begins in block S202 when a management request is sent by management application 52 to acquire information regarding switch 34. The management request is sent in a standard format where the management application 52 may be unaware of pseudo agent 68.

In block S204, proxy SCSI layer 60 encapsulates the management request into a SCSI CDB. The SCSI CDB is then placed in a Fibre Channel packet having a FCP and FC header. In block S206, the Fibre Channel packet with the SCSI CDB having the management request is sent by adapter 14 using standard FC addressing scheme and the standard FC link 15A. Layers 64 and 66 are used to add the standard FCP/FC headers for sending the management request in a Fibre Channel packet.

In block S208, switch 34 first strips the FCP and FC header. The pseudo target service 70 extracts the management request and sends the management request to the switch management module 82. The switch management module 82 may also be unaware of the pseudo target service 70 and operates as if it was handling a regular management request that is received via an Ethernet link. Switch management module 82 performs the necessary tasks to respond to the management request. Switch management module 82 prepares the response to the management request.

The response is then sent to proxy SCSI layer 78 that generates a SCSI CDB for the response. The SCSI CDB is then encapsulated into a standard Fibre Channel packet with a FCP and FC header. The Fibre Channel packet with the response is then transmitted by switch 34 using the FC link 15A.

The encapsulated response is received by adapter 14 in block S210. The FCP/FC headers are stripped and the pseudo agent 68 extracts the response that is generated by the switch management module 82. The response is then forwarded to the switch management application 52. The switch management application 52 receives the response in the same format as if an Ethernet link was being used. Thus, a management request is processed without using a separate Ethernet network and without changing the structure of management application 52 or switch management module 82.

Figure 2B:
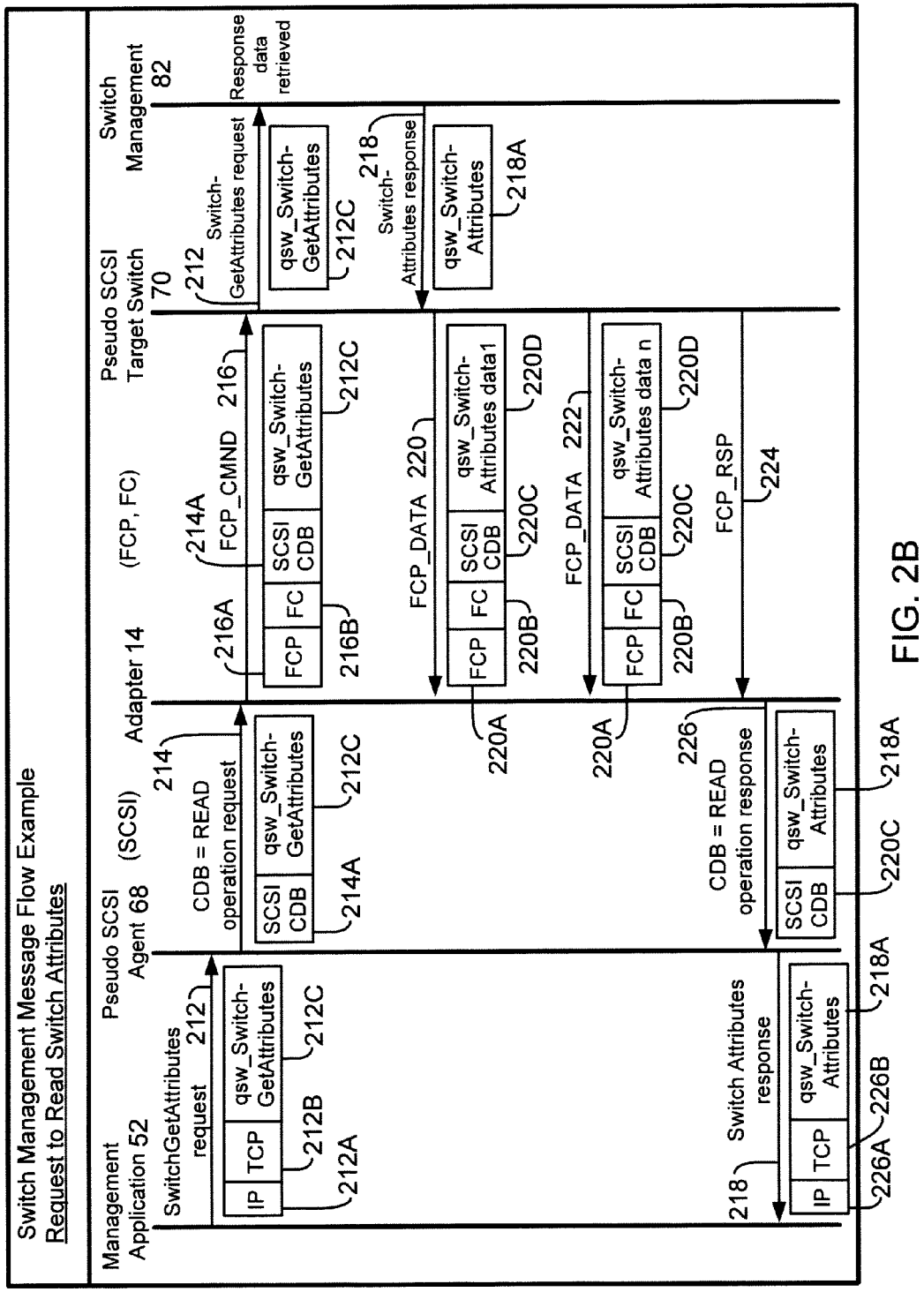
FIG. 2B shows an example of processing management requests, according to one embodiment.

FIG. 2B shows an example of processing a management request 212 to obtain switch 34 attributes based on the process flow of FIG. 2A and using system 10A (FIG. 1B). Management request 212 may be generated by management application 52 and includes an IP header 212A, a TCP header 212B and the request qw_switchGetAttributes 212C. Pseudo SCSI agent 68 executed at computing system 12 generates a SCSI request 214 for a standard SCSI "read operation". The SCSI request 214 includes a SCSI CDB 214A and the original request 212C received from the management application 52. The SCSI read request 214 is then sent to adapter 14 that generates a Fibre Channel command, shown as FCP_CMND 216. The FCP_CMND includes a FCP header 216A, a FC header 216B, the SCSI CDB 214A and request 212C received from management application 52. The FCP_CMND 216 is received by pseudo SCSI target service 70 at switch 34. Service 70 strips the FCP header 216A, FC header 216B, SCSI CDB 214A and extracts the original management request 212.

The original management request 212 is then passed to switch management module 82. The switch management module 82 acquires switch 34 attributes and prepares a response 218 that includes switch attributes 218A. Response 218 is then passed to pseudo SCSI target service 70 that generates a FCP response shown as FCP_RSP 224. The response may be preceded by one or more data packets shown as FCP_DATA 220 and FCP_DATA 222. Each FCP_DATA packet includes a FCP header 220A, a FC header 220B, a SCSI CDB 220C and the switch attributes 220D.

The FCP response is processed by the adapter 14 that passes the response to pseudo SCSI agent 68 as a "read operation response" 226. The read operation response 226 includes a SCSI CDB 220C and the switch attributes 218A. Pseudo SCSI agent 68 then strips the SCSI CDB 220C and extracts response 218. Response 218 includes an IP header 226A (similar to 212A), a TCP header 226B (similar to 212B) and the switch attributes 218A. Response 218 is then forwarded to management application 52.

As described above, management application 52 and switch management module 82 do not need to be changed or modified. They operate as if two networks are being used with respect to switch 34, one for Fibre Channel data and another for management requests/responses. Agent 68 and pseudo service 70 are able to process management requests/responses using the same link that are used for regular Fibre Channel traffic. This saves the cost of having two links and reduces the complexity because one does not have to manage the Ethernet network.

Although the present disclosure has been described with reference to specific embodiments, these embodiments are illustrative only and not limiting. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine-implemented method, comprising:

generating a management request complying with a first protocol, the management request seeking information about a network device;

encapsulating the management request using a second protocol;

transmitting the encapsulated management request using a third protocol via a link used to send input or output requests for reading and writing data from a computing system to a storage device;

accepting the encapsulated management request at the storage device;

de-encapsulating the management request to provide the management request complying with the first protocol to a management module of the network device;

preparing a response to the management request complying with the first protocol;

encapsulating the response using the second protocol;

transmitting the encapsulated response from the network device to the computing system using the third protocol across the same link used by the computing system to send input or output requests for reading and writing data;

extracting the response complying with the first protocol from the encapsulated response; and providing the response complying with the first protocol to a management application of the computer system;

whereby the processor executable agent and the processor executable service alleviate the need for a second link for handling management requests.

2. The method of claim 1, wherein the first protocol is an Ethernet protocol.

3. The method of claim 1, wherein the second protocol is a Small Computer Systems Interface (SCSI) protocol.

4. The method of claim 1, wherein the third protocol is a Fibre Channel protocol.

5. The method of claim 1, wherein the network device is a switch.

6. The method of claim 1, wherein an adapter interfacing with the computing system and the network device transmits the management request to the network device using the third protocol.

7. A system, comprising:

a processor of a computing system executing a management application for generating a management request complying with a first protocol, the management request seeking information about a network device;

a processor executable agent executed by the computing system configured to encapsulate the management request using a second protocol;

the network device configured to receive the encapsulated management request via a third protocol using a link used by the computing system to send input or output requests for reading and writing data to a storage device;

wherein the network device de-encapsulates the management request to provide the management request complying with the first protocol to a management module of the network device that prepares a response to the management request complying with the first protocol;

a processor executable service at the network device configured to encapsulate the response using the second protocol and the encapsulated response is transmitted to the computing system using the third protocol across the same link used by the computing system to send input or output requests for reading and writing data; and wherein the response complying with the first protocol is extracted from the encapsulated response and then provided to the management application;

whereby the processor executable agent and the processor executable service alleviate the need for a second link for handling management requests.

8. The system of claim 7, wherein the first protocol is an Ethernet protocol.

9. The system of claim 7, wherein the second protocol is a Small Computer Systems Interface (SCSI) protocol.

10. The system of claim 7, wherein the third protocol is a Fibre Channel protocol.

11. The system of claim 7, wherein the network device is a switch.

12. The system of claim 7, wherein an adapter interfacing with the computing system and the network device transmits the management request to the network device using the third protocol.

* * * * *

UNITED STATES PATENT AND TRADEMARK OFFICE
CERTIFICATE OF CORRECTION

PATENT NO.        : 9,071,544 B2                                      Page 1 of 1
APPLICATION NO.   : 13/193462
DATED             : June 30, 2015
INVENTOR(S)       : Ainsworth et al.

It is certified that error appears in the above-identified patent and that said Letters Patent is hereby corrected as shown below:

In the specification
In column 4, line 32, delete "IP." and insert -- IP, --, therefor.

Signed and Sealed this
First Day of December, 2015

Michelle K. Lee
*Director of the United States Patent and Trademark Office*